US012264814B2

(12) United States Patent
Bower

(10) Patent No.: US 12,264,814 B2
(45) Date of Patent: Apr. 1, 2025

(54) TAPERED CANDLE BASE DEVICE

(71) Applicant: Jennie Bower, Little River, CA (US)

(72) Inventor: Jennie Bower, Little River, CA (US)

( * ) Notice: Subject to any disclaimer, the term of this patent is extended or adjusted under 35 U.S.C. 154(b) by 422 days.

(21) Appl. No.: 17/830,441

(22) Filed: Jun. 2, 2022

(65) Prior Publication Data

US 2023/0122770 A1 Apr. 20, 2023

Related U.S. Application Data

(60) Provisional application No. 63/255,555, filed on Oct. 14, 2021.

(51) Int. Cl.
*F21V 35/00* (2006.01)

(52) U.S. Cl.
CPC ............ *F21V 35/003* (2013.01); *F21V 35/00* (2013.01)

(58) Field of Classification Search
CPC ............................... F21V 35/003; F21V 35/00
USPC ........................................................ 431/297
See application file for complete search history.

(56) References Cited

U.S. PATENT DOCUMENTS

| | | | | |
|---|---|---|---|---|
| 1,474,910 A * | 11/1923 | Petersen | F21V 35/00 | 431/297 |
| 4,036,577 A * | 7/1977 | Veitel | F21V 35/00 | 431/297 |
| 2014/0120482 A1* | 5/2014 | Moy | F21V 35/003 | 431/291 |
| 2022/0117419 A1* | 4/2022 | McGuire | A47G 19/00 | |

* cited by examiner

*Primary Examiner* — Laura K Tso
(74) *Attorney, Agent, or Firm* — Brennan, Manna & Diamond, LLC

(57) ABSTRACT

The present invention relates generally to the field of candles. More specifically, the present invention relates to a tapered candle base device preferably comprised of at least one grip mat and at least one candle base that receives the grip mat within an opening. The grip mat can be wrapped around a tapered or non-tapered candle, wherein the candle and grip mat can then be placed within the candle base such that the candle is secured within the candle base via the grip mat.

19 Claims, 3 Drawing Sheets

TAPERED CANDLE BASE DEVICE

CROSS-REFERENCE TO RELATED APPLICATION

The present application claims priority to, and the benefit of, U.S. Provisional Application No. 63/255,555, which was filed on Oct. 14, 2021, and is incorporated herein by reference in its entirety.

FIELD OF THE INVENTION

The present invention relates generally to the field of candles. More specifically, the present invention relates to a tapered candle base device preferably comprised of at least one grip mat and at least one candle base that receives the grip mat within an opening. The grip mat can be wrapped around a tapered or non-tapered candle, wherein the candle and grip mat can then be placed within the candle base such that the candle is secured within the candle base via the grip mat. Accordingly, the present disclosure makes specific reference thereto. Nonetheless, it is to be appreciated that aspects of the present invention are also equally applicable to other like applications, devices and methods of manufacture.

BACKGROUND

Many individuals enjoy using candles for aromatic or aesthetic purposes. Tapered candles can be difficult to keep stable within a candle holder. As a result, a tapered candle may lean to one side of the holder. This not only looks aesthetically unpleasing, but also creates a potential fire hazard. If the candle leans too far over and falls out of the candle holder, the surrounding area may be caught on fire. Further, current methods of using adhesive tape or other similar methods are often unsuccessful as the tape may fail to adhere to the candle surface or is not strong enough to prevent the candle from leaning within a candle holder.

Therefore, there exists a long-felt need in the art for a device that secures a tapered candle. There also exists a long-felt need in the art for a tapered candle base device that prevents a tapered candle from leaning over within the holder. Finally, there exists a long-felt need in the art for a tapered candle base that eliminates potential fire hazards that can be caused by leaning candles.

The subject matter disclosed and claimed herein, in one embodiment thereof, comprises a tapered candle base device. In the preferred embodiment, the device is comprised of at least one grip mat and at least one candle base that receives the grip mat within an opening. The grip mat can be wrapped around a tapered or non-tapered candle, wherein the candle and grip mat can then be placed within the candle base. As a result, the candle is secured within the candle base via the grip mat.

In this manner, the tapered candle base device of the present invention accomplishes all of the foregoing objectives and provides a device that secures a tapered candle. More specifically, the device prevents a tapered candle from leaning over within the holder. As a result, the device eliminates potential fire hazards that can be caused by leaning candles.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a tapered candle base device. In the preferred embodiment, the device is comprised of at least one grip mat and at least one candle base that receives the grip mat within an opening. The grip mat is preferably circular in shape and can be secured around the side surface and/or bottom surface of a tapered or non-tapered candle. The grip mat is preferably made from a non-slip rubber material that preferably has a coefficient of friction value greater than one. The top surface and bottom surface may also have at least one indicia such as, but not limited to: patterns, logos, emblems, images, symbols, designs, letters, numbers, words, characters, animals, advertisements, brands, etc.

The device may also be comprised of at least one candle base that has a flat bottom surface with a stem that attaches to a top surface. The top surface has a raised edge that prevents candle wax from spilling out of the base. Further, the top surface has at least one opening that can receive the side surface and bottom surface of a tapered or non-tapered candle such that the candle can securely sit within the base.

In one embodiment, the interior surface of the opening of the base may further be comprised of at least one fastener. Similarly, the bottom surface of the grip mat may also have at least one fastener. As a result, the fastener of the grip mat can be secured to the fastener of the base such that the grip mat is secured to the base while the grip mat is placed around a candle.

Accordingly, the tapered candle base device of the present invention is particularly advantageous as it provides a device that secures a tapered candle and prevents a tapered candle from leaning over within the holder. Therefore, the device eliminates potential fire hazards that can be caused by leaning candles. In this manner, the tapered candle base device overcomes the limitations of existing candle holders known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
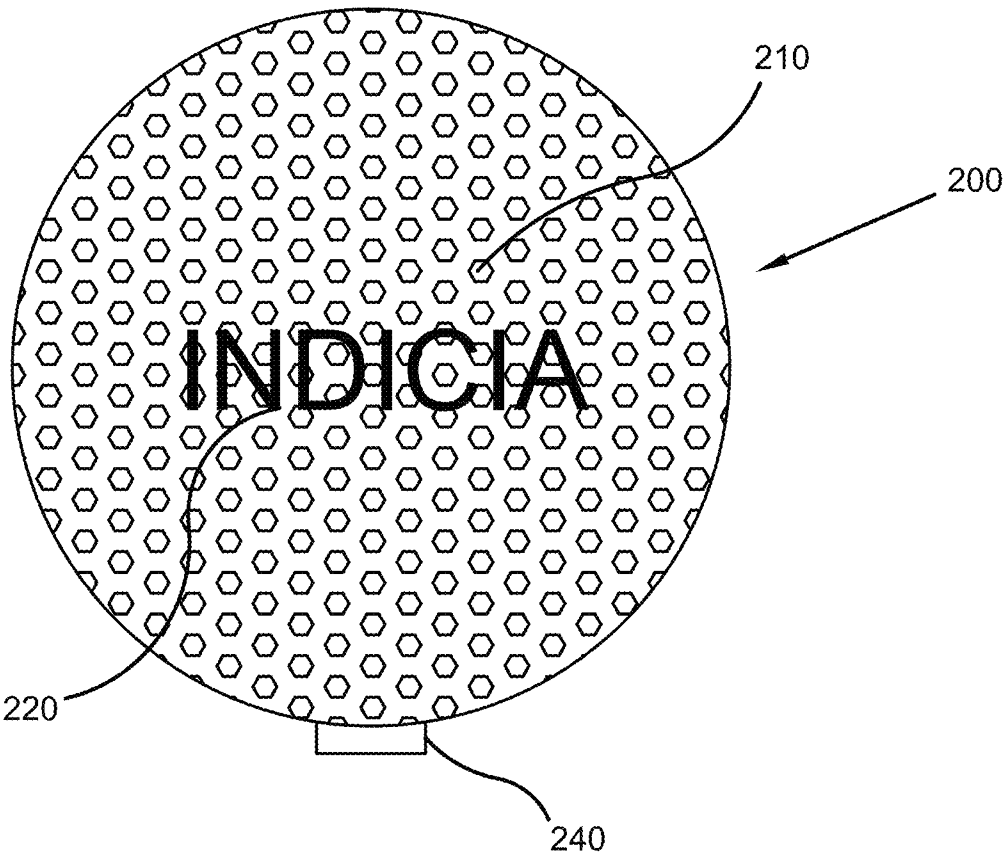
FIG. 1 illustrates a top view of one potential embodiment of a tapered candle base device of the present invention in accordance with the disclosed architecture.
Figure 2:
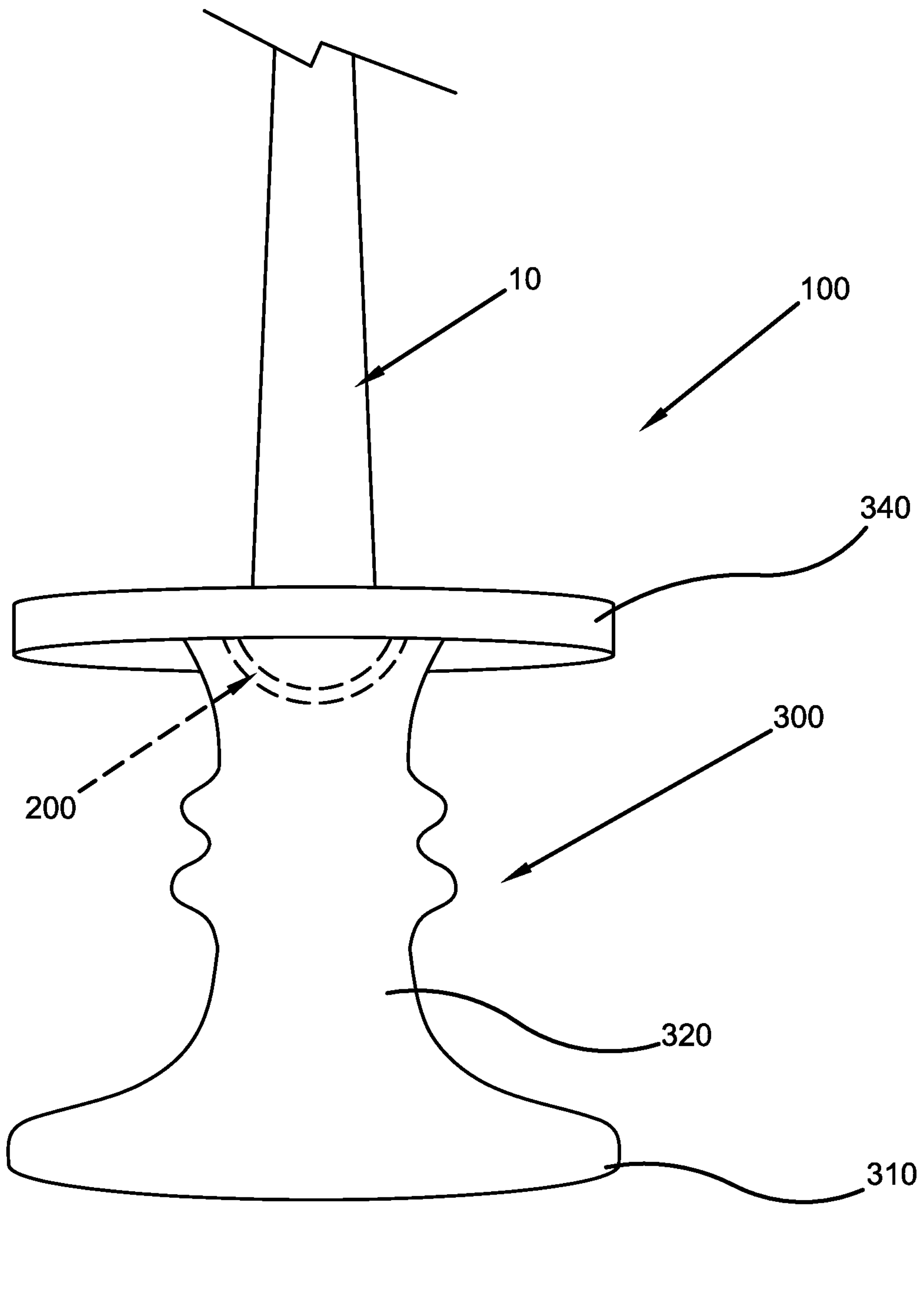
FIG. 2 illustrates a side view of one potential embodiment of a tapered candle base device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that secures a tapered candle. There also exists a long-felt need in the art for a tapered candle base device that prevents a tapered candle from leaning over within the holder. Finally, there exists a long-felt need in the art for a tapered candle base that eliminates potential fire hazards that can be caused by leaning candles.

The present invention, in one exemplary embodiment, is comprised of a tapered candle base device comprised of at least one grip mat and at least one candle base that receives the grip mat within an opening. The grip mat is preferably circular in shape and can be secured around the side surface and/or bottom surface of a tapered or non-tapered candle. The grip mat is preferably made from a non-slip rubber material that preferably has a coefficient of friction value greater than one, and wherein the top surface and bottom surface may also have at least one indicia such as, but not limited to: patterns, logos, emblems, images, symbols, designs, letters, numbers, words, characters, animals, advertisements, brands, etc.

The device may also be comprised of at least one candle base that has a flat bottom surface with a stem that attaches to a top surface. The top surface has a raised edge that prevents candle wax from spilling out of the base. Further, the top surface has at least one opening that can receive the side surface and bottom surface of a tapered or non-tapered candle such that the candle can securely sit within the base.

In one embodiment, the interior surface of the opening of the base may further be comprised of at least one fastener. Similarly, the bottom surface of the grip mat may also have at least one fastener. As a result, the fastener of the grip mat can be secured to the fastener of the base such that the grip mat is secured to the base while the grip mat is placed around a candle.

Referring initially to the drawings, FIG. 1 illustrates a top view of one potential embodiment of a tapered candle base device 100 of the present invention in accordance with the disclosed architecture. In the preferred embodiment, the device 100 is comprised of at least one grip mat 200 and at least one candle base 300 that receives the grip mat 200 within an opening 350. The grip mat 200 is preferably circular in shape. However, in differing embodiments the mat 200 may be any shape known in the art such as, but not limited to: square, triangular, rectangular, etc., that allows the grip mat 200 to be secured around the side surface 12 and/or bottom surface 14 of a tapered or non-tapered candle 10. The grip mat 200, and more specifically the top surface 210 and bottom surface 230 of the grip mat 200, are made from a non-slip rubber material in the preferred embodiment that has a coefficient of friction value greater than one. However, in differing embodiments the grip mat 200 may be made of any material with a coefficient of friction value greater than one. The top surface 210 and bottom surface 230 may also have at least one indicia 220 such as, but not limited to: patterns, logos, emblems, images, symbols, designs, letters, numbers, words, characters, animals, advertisements, brands, etc. The bottom surface 230 and/or top surface 210 of the grip mat 200 may further be comprised of an adhesive layer that is specifically designed to adhere to the wax of a candle 10 and to the base 300 (as will be explained more fully below).

The device 100 may also be comprised of at least one candle base 300. The base 300 may be made from glass or other durable metal material such as, but not limited to, stainless steel, bronze, cast iron, etc. The base 300 has a flat bottom surface 310 with a stem 320 that attaches to a top surface 330. The top surface 330 has a raised edge 340 that prevents candle wax from spilling out of the base 300. The top surface 330 further has at least one opening 350 that can receive the side surface 12 and bottom surface 14 of a tapered or non-tapered candle 10. In this manner, the candle 10 can securely sit within the base 300. In an embodiment where the grip mat 200 has an adhesive bottom surface 230 and top surface 210, the adhesive bottom surface 230 further secures the mat 200 to the candle 10, and the mat 200 to and within the opening 350.

Figure 3:
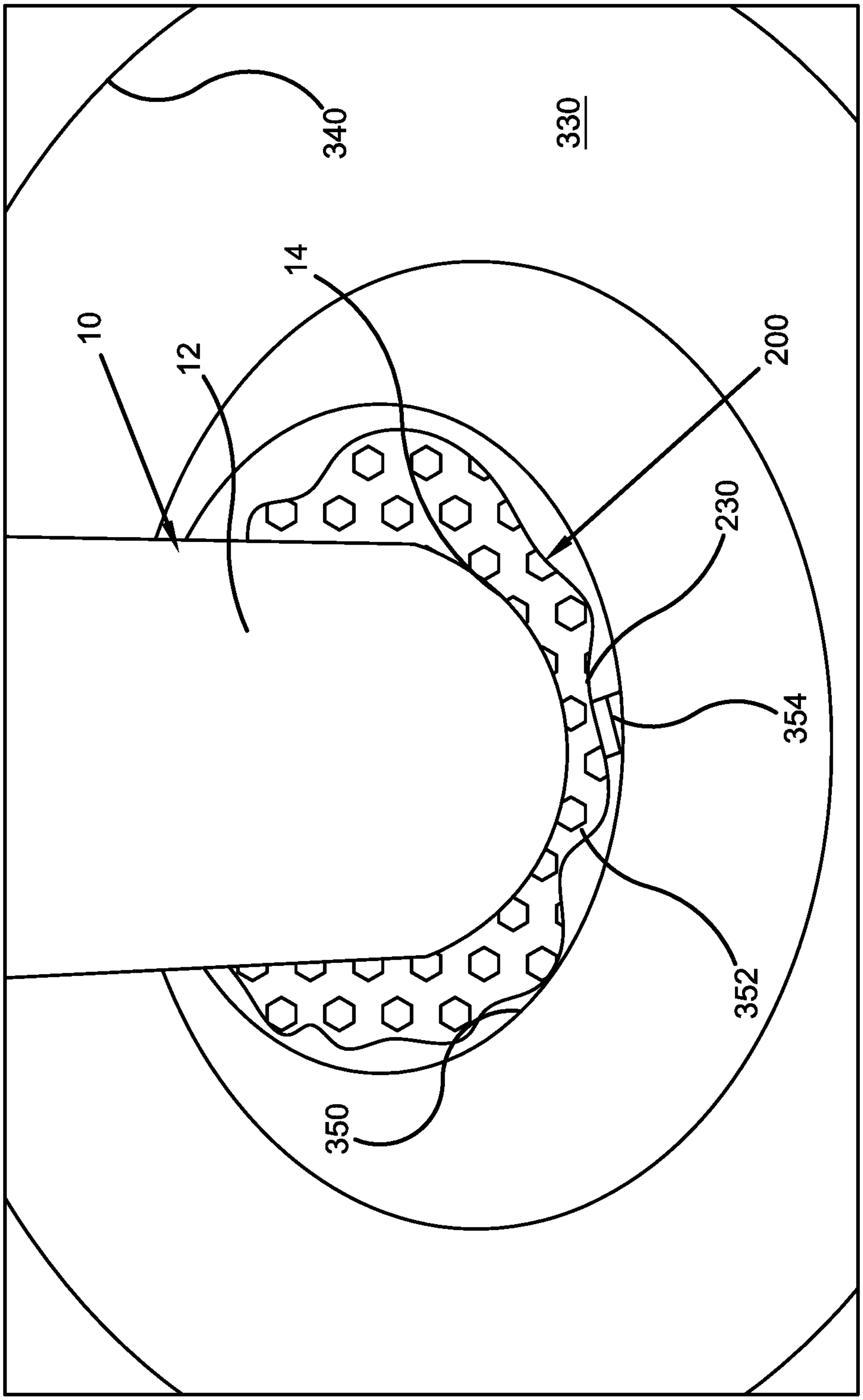
FIG. 3 illustrates a perspective view of one potential embodiment of a tapered candle base device of the present invention in accordance with the disclosed architecture.

As best seen in FIG. 3, the interior surface 352 of the opening 350 may further be comprised of at least one fastener 354. In differing embodiments, the fastener 354 may be any fastener type known in the art such as, but not limited to: hook, loop, magnet, adhesive, snap button, etc. The bottom surface 230 of the grip mat 200 may also have at least one fastener 240. In differing embodiments, the fastener 240 may be any fastener type known in the art such as, but not limited to: hook, loop, magnet, adhesive, snap button, etc. In this manner, the fastener 240 of the grip mat 200 can be secured to the fastener 354 of the base 300 such that the grip mat 200 is secured to the base 300 while the grip mat 200 is placed around a candle 10.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "tapered candle base device" and "device" are interchangeable and refer to the tapered candle base device 100 of the present invention.

Notwithstanding the foregoing, the tapered candle base device 100 of the present invention and its various components can be of any suitable size and configuration as is known in the art without affecting the overall concept of the invention, provided that they accomplish the above-stated objectives. One of ordinary skill in the art will appreciate that the size, configuration and material of the tapered candle base device 100 as shown in the FIGS. are for illustrative purposes only, and that many other sizes and shapes of the tapered candle base device 100 are well within the scope of the present disclosure. Although the dimensions of the tapered candle base device 100 are important design parameters for user convenience, the tapered candle base device

100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A tapered candle base device comprising:
- a grip mat comprised of:
  - a top surface;
  - a bottom surface comprising a fastener; and
  - a plurality of openings extending between the top surface and bottom surfaces; and
- a candle base comprising a top surface, an opening in the top surface, and a fastener on an interior surface of the opening; and
- wherein the fastener on the bottom surface of the grip mat is configured to engage the fastener of the candle base to secure the grip mat to the candle base.

2. The tapered candle base device of claim 1, wherein the top surface of the grip mat is comprised of an adhesive.

3. The tapered candle base device of claim 1, wherein the grip mat is comprised of a non-slip rubber material.

4. The tapered candle base device of claim 3, wherein the non-slip rubber material has a coefficient of friction value greater than 1.

5. The tapered candle base device of claim 1, wherein the bottom surface of the grip mat is comprised of an adhesive.

6. The tapered candle base device of claim 1, wherein the top surface of the grip mat is further comprised of an indicia in the form of a pattern, a logo, an emblem, an image, a symbol, a design, a letter, a word, a character, an animal, an advertisement or a brand.

7. A tapered candle base device comprising:
- a grip mat further comprised of a top surface and a bottom surface; and
- a candle base further comprised of a top surface with an opening; and
- wherein a grip mat fastener is configured to engage a candle base fastener to secure the grip mat to the candle base; and
- wherein the candle base further comprises a raised edge on the top surface of the candle base.

8. The tapered candle base device of claim 7, wherein the grip mat is comprised of a non-slip rubber material.

9. The tapered candle base device of claim 8, wherein the non-slip rubber material has a coefficient of friction value greater than one.

10. The tapered candle base device of claim 7, wherein the candle base is comprised of a glass material.

11. The tapered candle base device of claim 7, wherein the opening of the candle base is sized and configured to receive a candle.

12. The tapered candle base device of claim 7, wherein the top surface of the grip mat is comprised of an adhesive.

13. A tapered candle base device comprising:
- a grip mat comprised of a top surface, a bottom surface and a fastener; and
- a candle base comprised of a top surface having an opening and a raised edge, wherein an interior surface of the opening is comprised of a fastener; and
- wherein the fastener of the grip mat is configured to engage the fastener of the candle base to secure the grip mat to the candle base.

14. The tapered candle base device of claim 13, wherein the grip mat is comprised of a non-slip rubber material.

15. The tapered candle base device of claim 14, wherein the non-slip rubber material has a coefficient of friction value greater than one.

16. The tapered candle base device of claim 13, wherein the fastener of the grip mat is a hook fastener, a loop fastener, an adhesive fastener, a magnet fastener or a snap button fastener.

17. The tapered candle base device of claim 13, wherein the fastener of the interior surface of the candle base is a hook fastener, a loop fastener, an adhesive fastener, a magnet fastener or a snap button fastener.

18. The tapered candle base device of claim 13, wherein the candle base is comprised of a glass material.

19. The tapered candle base device of claim 13, wherein the opening of the candle base is sized and configured to receive a candle.

* * * * *